(12) United States Patent
Chen et al.

(10) Patent No.: US 7,439,642 B2
(45) Date of Patent: Oct. 21, 2008

(54) BRUSHLESS DC MOTOR AND MAGNETIC COMPENSATION METHOD THEREOF

(75) Inventors: Lee-Long Chen, Taoyuan Hsien (TW); Chien-Hsiung Huang, Taoyuan Hsien (TW); Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 384 days.

(21) Appl. No.: 11/295,527

(22) Filed: Dec. 7, 2005

(65) Prior Publication Data

US 2007/0001532 A1 Jan. 4, 2007

(30) Foreign Application Priority Data

Jun. 30, 2005 (TW) .............................. 94122152 A

(51) Int. Cl.
*H02K 11/00* (2006.01)
(52) U.S. Cl. .................................. 310/68 R; 310/68 B

(58) Field of Classification Search ................ 310/67 R, 310/68 R, 68 B, 156.06–156.07
See application file for complete search history.

(56) References Cited

U.S. PATENT DOCUMENTS

| 4,286,184 | A  | * | 8/1981  | Kogler et al. ............. 310/67 R |
| 5,041,749 | A  | * | 8/1991  | Gaser et al. ............ 310/156.22 |
| 6,127,752 | A  | * | 10/2000 | Wiesler .................... 310/68 B |
| 6,198,196 | B1 | * | 3/2001  | De Simon et al. .......... 310/268 |
| 7,332,839 | B2 | * | 2/2008  | Jajtic et al. ................ 310/68 B |
| 2002/0014804 | A1 | * | 2/2002 | Nelson et al. ............. 310/67 R |
| 2004/0174080 | A1 | * | 9/2004 | Beyer et al. ................ 310/90.5 |
| 2005/0001493 | A1 | * | 1/2005 | Jajtic et al. ................ 310/68 R |

* cited by examiner

*Primary Examiner*—Thanh Lam
(74) *Attorney, Agent, or Firm*—Birch, Stewart, Kolasch & Birch, LLP

(57) ABSTRACT

A magnetic compensation method for a brushless DC motor. The method of magnetic compensation for the motor provides the magnetic element disposed adjacent to the magnetic sensor to compensate the magnetic sensor for an unnecessary magnetic interference, so that the magnetic sensor provides a regular voltage difference to drive the motor.

9 Claims, 4 Drawing Sheets

BRUSHLESS DC MOTOR AND MAGNETIC COMPENSATION METHOD THEREOF

This Non-provisional application claims priority under U.S.C.§ 119(a) on Patent Application No(s). 094122152 filed in Taiwan, Republic of China on Jun. 30, 2005, the entire contents of which are hereby incorporated by reference.

BACKGROUND

The invention relates to a motor and magnetic compensation method thereof, and in particular to a brushless DC motor and magnetic compensation method providing a magnetic element to compensate a Hall sensor for magnetic bias interfered by an ambient magnetic pole.

Referring to FIG. 1, which is a schematic sectional view of a conventional brushless motor. In FIG. 1, a conventional brushless DC motor (m) includes a rotor 10 and a stator 20. The rotor 10 is a hollow and cylindrical rotor, with a closed end and an open end, includes a shaft 102 centrally disposed on the closed end of the rotor 10 and extended toward the stator 20, and a magnetic ring 103 disposed in the rotor 10 to enclose the stator 20.

The stator 20 includes a base 201, multiple silicon-steel sheets 202 stacked and disposed around the exterior of the seat 201 and wound by coils, a bearing 203 disposed in the base 201 to support the shaft 102 of the rotor 10, and a circuit board 204 disposed on the base 201 and located under the silicon-steel sheets 202. The circuit board 204 includes a control circuit (not shown) and a Hall sensor 205 for inducing the magnetic ring 103.

When the brushless DC motor (m) is actuated, the Hall sensor 205 on the circuit board 204 is coupled to the magnetic pole of the magnetic ring 103 of the rotor 10, and then a small voltage difference is output to the control circuit of the circuit board 204 according to magnetism of the magnetic ring 103. Based on the voltage difference output from the Hall sensor 205, the control circuit of the circuit board 204 determines whether the magnetic poles of the stator 20 are switched. Thus, the Hall sensor 205 coupled to the magnetic poles of the stator 20 drives the rotor 10.

If the distance between the Hall sensor 205 and the magnetic ring 103 is too great to output a regular voltage difference, i.e., a greater distance from the Hall sensor 205 to the magnetic ring 103 causes a relatively smaller magnetism induced by the Hall sensor 205. Further, if the Hall sensor 205 is interfered by the ambient magnetism, the accuracy of the output signal from the Hall sensor 205 is greatly affected. For example, if there are other magnetic elements disposed in the brushless DC motor (m), the accuracy of the output signal from the Hall sensor 205 is decreased due to ambient unnecessary magnetic influence.

Referring to FIG. 2A, which is a diagram showing the relationship between output voltage difference and phrase of magnetic pole for a Hall sensor of a conventional brushless motor interfered by ambient magnetism. In FIG. 2A, when the Hall sensor 205 is interfered by the ambient magnetic poles, irregular and asymmetric signals are produced between the N and S magnetic poles. Therefore, the magnitude of magnetism output from the stator 20 as determined by the control circuit of the circuit board 204 and the timing to switch the magnetic poles of the stator 20 are affected. Furthermore, the irregular signals between the N and S magnetic poles may damage the coupling between the rotor 10 and stator 20, resulting in a decelerating, vibrating or even locked rotor 10 during the operation.

Thus, it is an important issue that how to eliminate or reduce unnecessary magnetism interference to the Hall sensor in a motor.

SUMMARY

The invention provides a brushless DC motor and magnetic compensation method to compensate the Hall sensor for magnetic bias interfered by an ambient magnetism and magnetic poles by placing a magnetic element adjacent to a magnetic ring of a rotor.

The invention provides a magnetic element on a circuit board of the brushless DC motor, so that the magnetic element compensates magnetism induced by the Hall sensor and obtains a symmetric and regular output voltage at each magnetic pole.

The brushless DC motor of the invention includes a base, a stator, a rotor, a magnetic ring and a circuit board. The stator is disposed on the base. The rotor includes a shaft centrally disposed on the rotor and extended toward the stator. The magnetic ring is disposed in the rotor and encloses the stator. The circuit board is disposed on the base and includes a Hall sensor and a magnetic element. The magnetic element is used to compensate magnetism induced by the Hall sensor.

The magnetic bias interfered by an ambient magnetism and magnetic poles is compensated by placing a magnetic element adjacent to a magnetic ring of a rotor so that the magnetic element compensates the Hall sensor, whereby preventing the rotor from decelerating, vibrating or even locking during the operation.

DESCRIPTION OF THE DRAWINGS

The invention can be more fully understood by reading the subsequent detailed description and examples with references made to the accompanying drawings, wherein.

DETAILED DESCRIPTION

Figure 3:
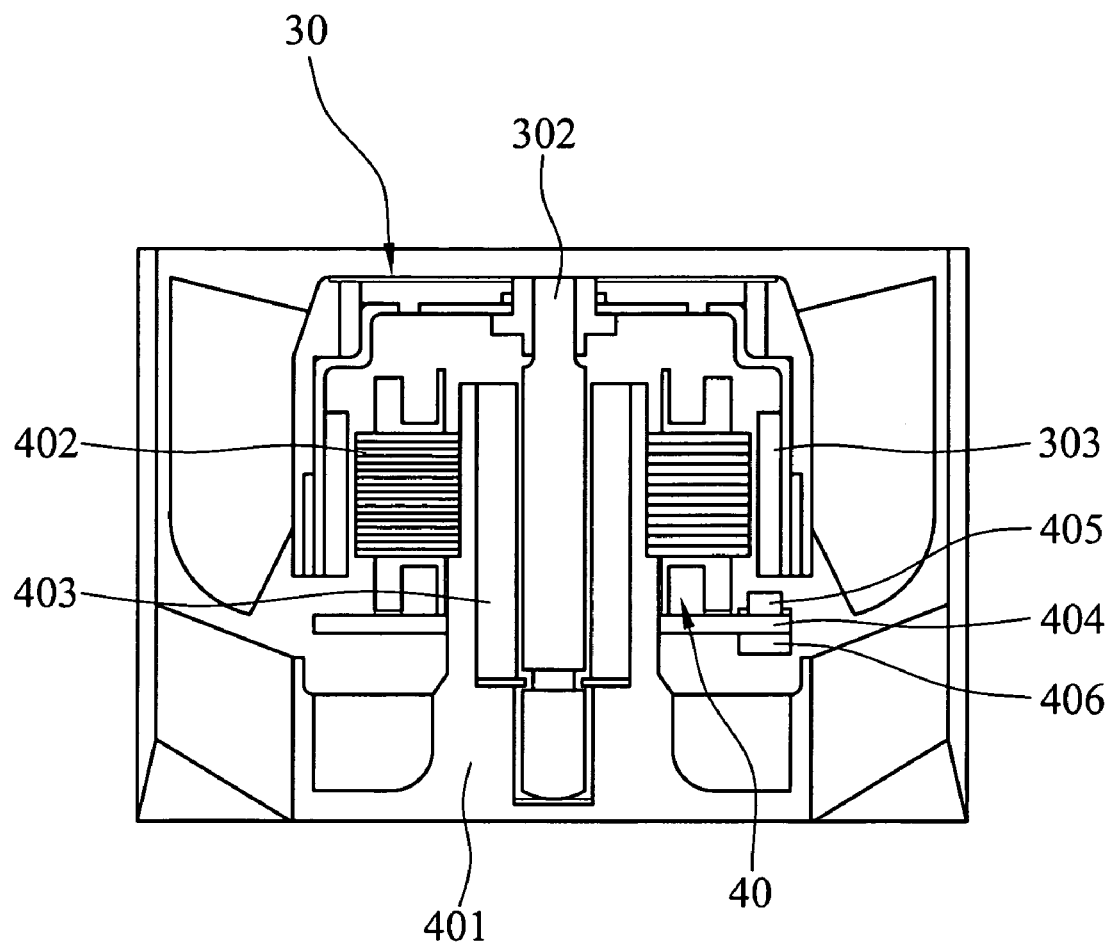
FIG. 3 is a schematic sectional view of a brushless DC motor of an embodiment of the invention.

Referring to FIG. 3, which is a schematic sectional view of a brushless DC motor of an embodiment of the invention. In FIG. 3, a brushless DC motor (M) of the invention includes a rotor 30 and a stator 40. The rotor 30 is a hollow and cylindrical rotor, with closed end and an open end, includes a shaft 302 and a magnetic ring 303. The shaft 302 is centrally disposed on the closed end of the rotor 30 and is extended toward the stator 40. The magnetic ring 303 is disposed in the rotor 30 to enclose the stator 40.

The stator 40 includes a base 401, multiple silicon-steel sheets 402 stacked and disposed around the exterior of the base 401 and wound by coils, a bearing 403 disposed in the base 401 to support the shaft 302 of the rotor 30, and a circuit board 404 disposed on the base 401 and located under the silicon-steel sheets 402. The circuit board 404 includes a control circuit (not shown), a Hall sensor 405 and a magnetic element 406. The Hall sensor 405 is used for inducing the magnetic ring 303

The Hall sensor 405 and the magnetic element 406 are respectively disposed on two opposite sides of the circuit board 404. The magnetic element 406 compensates the Hall sensor 405 for magnetic bias interfered by an ambient magnetic pole, so that the Hall sensor 405 outputs a regular voltage at each magnetic pole.

Figure 1:
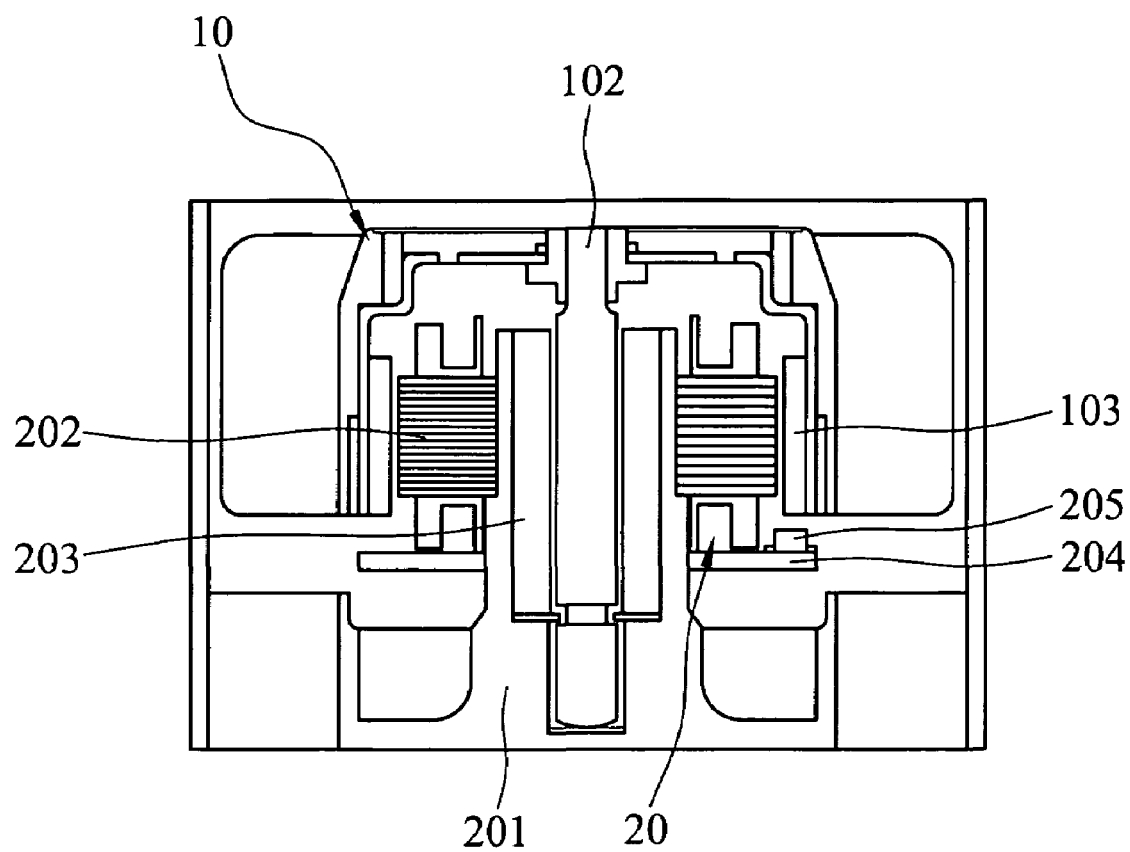
FIG. 1 is a schematic sectional view of a conventional brushless motor.
Figure 2A:
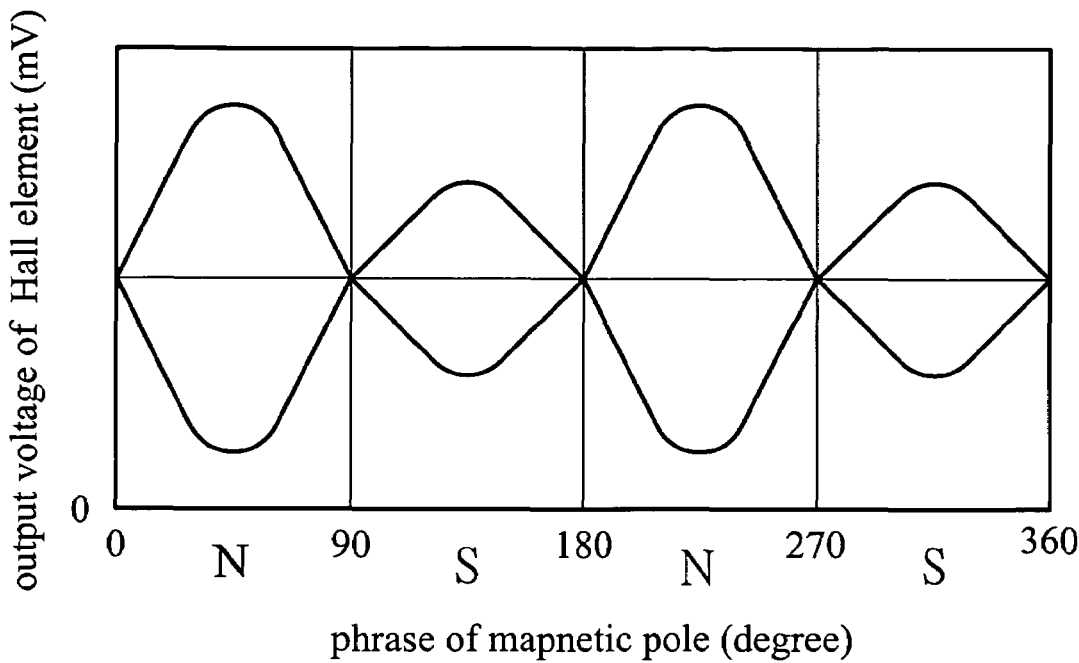
FIG. 2A is a diagram showing the relationship between output voltage difference and phrase of magnetic pole for a Hall sensor of a conventional brushless motor interfered by ambient magnetism.
Figure 2B:
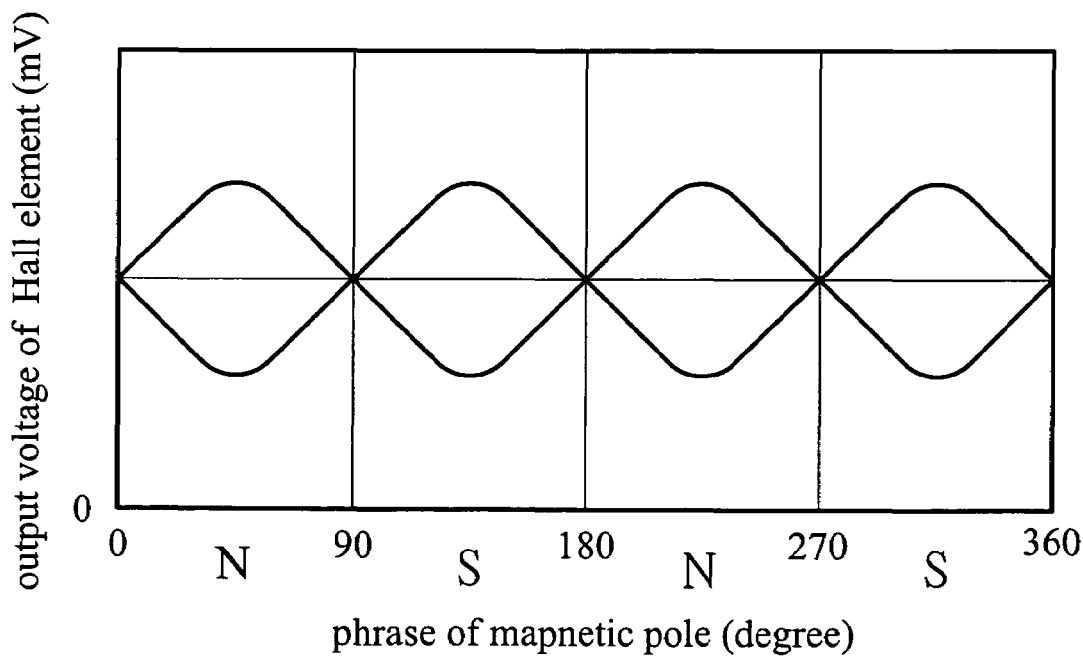
FIG. 2B is a diagram showing the relationship between output voltage difference and phrase of magnetic pole for a Hall sensor of a brushless DC motor of the invention, using a magnetic element to perform magnetic compensation.

Referring both to FIGS. 2A and 2B, FIG. 2B is a diagram showing the relationship between output voltage difference and phrase of magnetic pole for a Hall sensor of a brushless DC motor of the invention, using a magnetic element to perform magnetic compensation. In FIG. 2A, while the conventional motor (m) is not equipped with the magnetic element 406, the Hall sensor 405 is not only coupled to magnetism of the magnetic ring 303 but also coupled to ambient magnetic poles, such as additional N or S magnetic poles, e.g. the magnetic poles formed by other magnetic elements of the brushless DC motor. Therefore, it causes irregular and asymmetric signals produced between the N and S magnetic poles and an asymmetric and irregular output voltage difference formed in N and S magnetic pole phrases. In FIG. 2B, when the brushless DC motor (M) is equipped with the magnetic element 406, the magnetic element 406 compensates magnetism induced by the Hall sensor 405, and thus a symmetric and regular output voltage in N and S magnetic pole phrases difference is obtained.

Figure 4A:
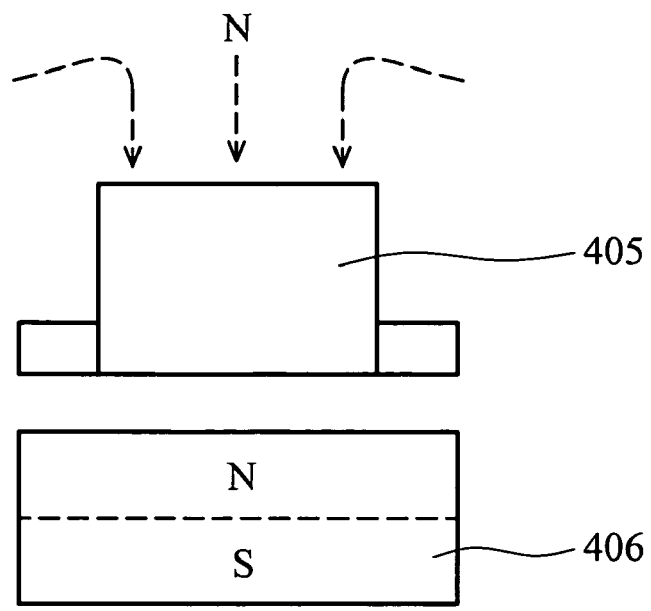
FIGS. 4A and 4B are two schematic views showing a Hall sensor with respect to a magnetic element of the invention.
Figure 4B:
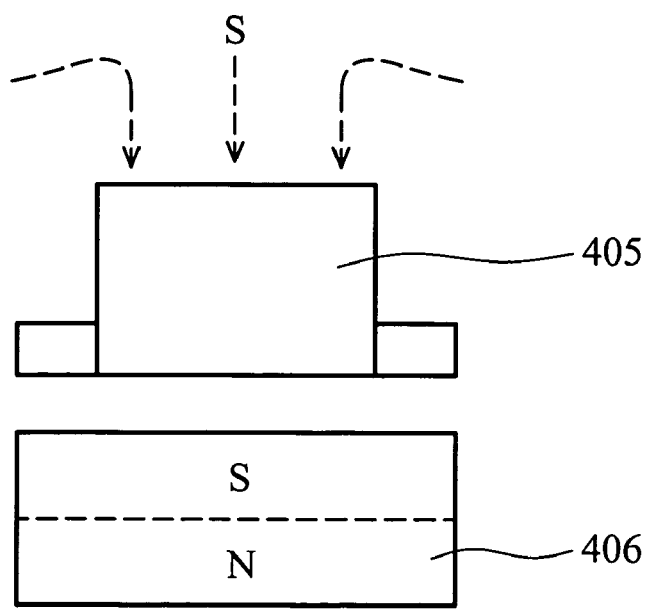

Referring both to FIGS. 4A and 4B, which are two schematic views showing a Hall sensor with respect to a magnetic element of the invention. When the Hall sensor 405 is coupled to a large magnetism from the N magnetic pole (shown by dotted arrow in FIG. 4A) in the motor (M), the magnetic element 406 is disposed adjacent to the Hall sensor 406 by way of placing the N magnetic pole of the magnetic element 406 to face the Hall sensor 406, so that magnetism with opposite magnetic lines of force is obtained from the magnetic element 406 to compensate for magnetic bias of the Hall sensor 405. Alternatively, when the Hall sensor 405 is coupled to a large magnetism from the S magnetic pole (shown by the dotted arrow in FIG. 4B) in the motor (M), the magnetic element 406 is disposed adjacent to the Hall sensor 406 by way of placing the S magnetic pole of the magnetic element 406 to face the Hall sensor 406, so that magnetism with opposite magnetic lines of force is obtained from the magnetic element 406 to compensate for magnetic bias of the Hall sensor 405.

In the above embodiment, the Hall sensor 405 and the magnetic element 406 are respectively disposed on two opposite sides of the circuit board 404, however, the Hall sensor 405 and the magnetic element 406 can be disposed on the same side of the circuit board 404, or the magnetic element 406 can be disposed any positions adjacent to the Hall sensor 405 rather than on the circuit board 404. Further, the magnetic element 406 can be formed as a square, circle, arc, polygonal shape, or other shapes according to requirements, and the magnitude of magnetism of the magnetic element 406 can be determined according to magnetism of the surrounding situation. Preferably, the magnetic element 406 is made of magnetic or a magnetically conductive material.

The method of magnetic compensation for the motor (M) provides the magnetic element 406 disposed adjacent to the magnetic sensor 405 to compensate the magnetic sensor 405 for an unnecessary magnetic interference, so that the magnetic sensor 405 provides a regular voltage difference to drive the motor (M). The motor is a brushless DC motor, and the magnetic sensor includes a Hall sensor.

The invention provides a magnetic element to compensate the Hall sensor 405 for magnetic bias generated by ambient magnetism or unnecessary magnetic interference. Thus, the Hall sensor 405 outputs a regular voltage at each magnetic pole to appropriately drive the rotor 30.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A brushless DC motor, comprising:
   a base;
   a stator disposed on the base;
   a rotor comprising a shaft extended toward the stator;
   a magnetic ring disposed in the rotor and enclosing the stator; and
   a circuit board disposed on the base and comprising a Hall sensor and a magnetic element;
   wherein the magnetic element compensates magnetism induced by the Hall sensor.

2. The brushless DC motor as claimed in claim 1 further comprising a bearing disposed in the base to support the shaft of the rotor.

3. The brushless DC motor as claimed in claim 1, wherein the Hall sensor and the magnetic element are both disposed on a same side of the circuit board.

4. The brushless DC motor as claimed in claim 1, wherein the Hall sensor and the magnetic element are respectively disposed on two different sides of the circuit board.

5. The brushless DC motor as claimed in claim 1, wherein the magnetic element is disposed adjacent to the Hall sensor.

6. The brushless DC motor as claimed in claim 1, wherein N pole of the magnetic element is located adjacent to the Hall sensor.

7. The brushless DC motor as claimed in claim 1, wherein S pole of the magnetic element is located adjacent to the Hall sensor.

8. The brushless DC motor as claimed in claim 1, wherein the magnetic element comprises a magnet or a magnetically conductive material.

9. The brushless DC motor as claimed in claim 1, wherein the magnetic element is formed as a square, circle, arc or polygonal shape.

* * * * *